United States Patent [19]

Fuchs

[11] 4,116,573
[45] Sep. 26, 1978

[54] FASTENING

[76] Inventor: Lothar U. Fuchs, 262 Mill Rd., Chelmsford, Mass. 01824

[21] Appl. No.: 781,716

[22] Filed: Mar. 28, 1977

[51] Int. Cl.² .............................................. F16B 9/02
[52] U.S. Cl. ................................... 403/264; 403/362; 403/187; 403/407; 403/409
[58] Field of Search .............. 403/258, 260, 264, 292, 403/294, 231, 362, 374, 407, 409; 52/584

[56] References Cited

U.S. PATENT DOCUMENTS

| | | | |
|---|---|---|---|
| 2,442,184 | 5/1948 | Summers | 403/409 X |
| 2,540,468 | 2/1951 | Anderson | 52/584 X |
| 2,648,248 | 8/1953 | Lederquist | 52/584 X |
| 2,815,997 | 12/1957 | Korb | 52/584 X |
| 3,469,869 | 9/1969 | Ramakers | 403/264 |
| 3,845,604 | 11/1974 | Ottosson | 403/231 X |
| 4,030,846 | 6/1977 | Flötotto | 403/231 |
| 4,045,927 | 9/1977 | Diaz | 403/409 X |

Primary Examiner—Wayne L. Shedd
Attorney, Agent, or Firm—Charles Hieken

[57] ABSTRACT

The end of a first member is fastened to the side of a second member via a releaseable rod. One end of the rod is threaded into a socket fixed in the side of the second member; the other end of the rod extends into a bore in the end of the first member. An internally threaded second socket is positioned in a transverse bore in the first member and said other end of the rod extends through the second socket. A conically ended setscrew is threaded into the second socket and engages a deep conical recess in the side of the rod. Upon tightening the setscrew, the end of the first member is pulled tightly against the side of the second member via the wedging action of the setscrew in the recess.

8 Claims, 4 Drawing Figures

FASTENING

BACKGROUND OF THE INVENTION

The present invention relates in general to fastening and more particularly concerns novel apparatus and techniques for fastening members together with a fastening rod characterized by relative ease in fabrication, assembly and installation while providing exceptionally secure fastening over long periods of time in a manner that facilitates disassembly with relative ease should that be desired and without glue. The invention is especially useful in fastening furniture and other members together.

A typical prior art approach includes a fastening rod embedded at one end in one member perpendicular to the length of the rod residing in a bore in a second member generally parallel to the length of the fastening rod with a camming mechanism near the end of the fastening rod inside the second member that is actuated with a screwdriver rotating a cam accessible in the face of the second member and generally perpendicular to the length of the fastening rod to pull the two members together. This arrangement is characterized by a number of disadvantages, especially susceptibility to becoming loose. Breakage is also not infrequent.

Other examples of the prior art include the following patents: U.S. Pat. Nos. 1,098,917, 2,442,184, 2,540,468, 3,017,657, 3,537,736, 3,672,710, 3,721,282, German Pat. No. 1,554,207 and British Pat. No. 1,049,694.

U.S. Pat. No. 3,017,657 discloses a removable handle assembly for stove doors in which a pointed set screw bears against a tapered annular groove in a stud to removably secure the handle portion to the stud. Although useful in securing the handle in which the set screw is seated to the stud secured to the stove door, this structural arrangement is inadequate for firmly seating one member to another in furniture and analogous construction where establishing firm contact over long periods of time is important, in part because material is removed from most of the annular groove that weakens the stud while being unnecessary for accommodating the set screw.

Accordingly, it is an important object of this invention to provide improved fastening.

It is a further object of the invention to achieve the preceding object while overcoming one or more of the disadvantages enumerated above in connection with the prior art.

It is a further object of the invention to achieve one or more of the preceding objects while providing a means for securely fastening two members together without glue, with apparatus relatively easy to use and facilitating disassembly of the members when and if desired while maintaining secure fastening for as long as desired.

SUMMARY OF THE INVENTION

According to the invention, there is fastening rod means formed with a conical opening near one end extending from one side of the rod toward at least the center of the rod and preferably beyond the center line so that an opening extends from one side of the fastening rod means to the other. Set screw means formed with a conical point generally parallel to the conical surface defining the conical opening is for being seated in a first member to be fastened to a second member by the fastening rod means for movement into the conical opening to urge the fastening rod means in a direction toward the end near the conical opening for urging the first and second members together, the fastening rod means having means for connection to the second member. Preferably, there is set screw holder means for screwably accommodating the set screw means and for being seated in a second bore in the first member perpendicular to a first bore in the first member for accommodating the fastening rod means. The other end of the fastening rod means may terminate a threaded stem for screwing into an expandable insert that is screwed into the second member. Alternatively, numerous other techniques may be used for connecting the fastening rod means to the second member, including the structure described above comprising the conical opening and set screw means. Preferably the conical opening has a taper typically 60° and the set screw holder means extends across the first bore and is formed with an opening perpendicular to the axis of the set screw means for accommodating the fastening rod means.

Numerous other features, objects and advantages of the invention will become apparent from the following specification when read in connection with the accompanying drawing in which:

DETAILED DESCRIPTION OF PREFERRED EMBODIMENTS

Figure 1:
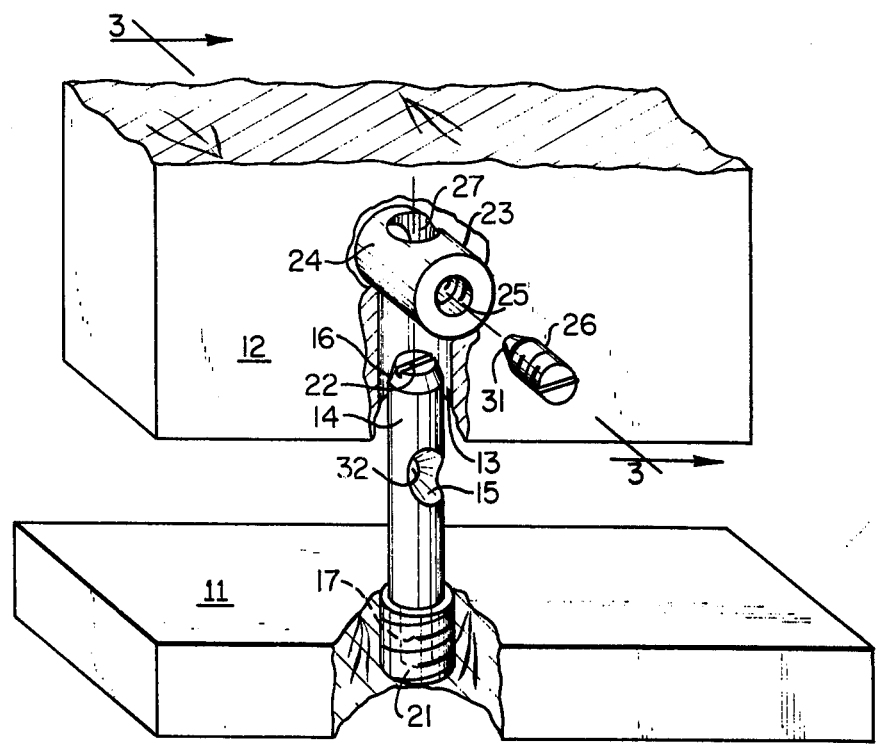
FIG. 1 is a perspective view of an embodiment of the invention for fastening a lower member to an upper member with internal portions of the members exposed to better illustrate the structural arrangement of the invention.

With reference now to the drawing and more particularly FIG. 1 thereof, there is shown a perspective view of an embodiment of the invention for securely fastening lower member 11 to upper member 12 according to the invention. Internal portions of members 11 and 12 are exposed to better illustrate the principles of the invention. Members 11 and 12 may typically be of particle board such as used in furniture. Upper member 12 is formed with a first bore 13 for accommodating fastening rod 14 formed with a conical opening 15 near its upper beveled end 16. Fastening rod 14 is formed with a threaded stud 17 at its lower end that is screwed into a plastic or metal expandable insert 21 screwed into lower member 11 to firmly connect fastening rod 14 to lower member 11. The upper end of fastening rod 14 is formed with a screwdriver slot 22, preferably aligned along the axis of conical opening 15 to facilitate positioning fastening rod 14 so that the large end of conical opening 15 faces the exposed face of upper member 12 with the axis of opening 15 substantially perpendicular to that face.

Upper member 12 is formed with a second bore 23 perpendicular to and passing through bore 13 for accommodating set screw holder 24 formed with a threaded internal opening 25 for accommodating set screw 26. Set screw holder 24 is formed with an opening 27 for accommodating fastening rod 14 as upper member 12 and lower member 11 move together to a point where internally threaded opening 25 is opposite conical opening 15 with the axis of the former essentially parallel to but slightly above the axis of the latter so that as set screw 26 is screwed into conical opening 15, these axes are urged together as the conical end 31 of set screw 26 urges fastening rod 14 upward and lower member 11 and upper member 12 firmly together.

Figure 2:
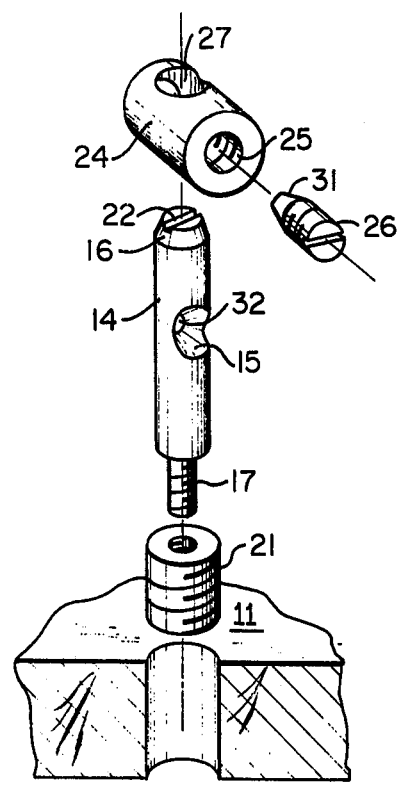
FIG. 2 is an exploded view of the invention.

Referring to FIG. 2, there is shown an exploded view of the key elements described above helpful in understanding their structure and relationship. The same reference symbols identify corresponding elements throughout the drawing.

Figure 3:
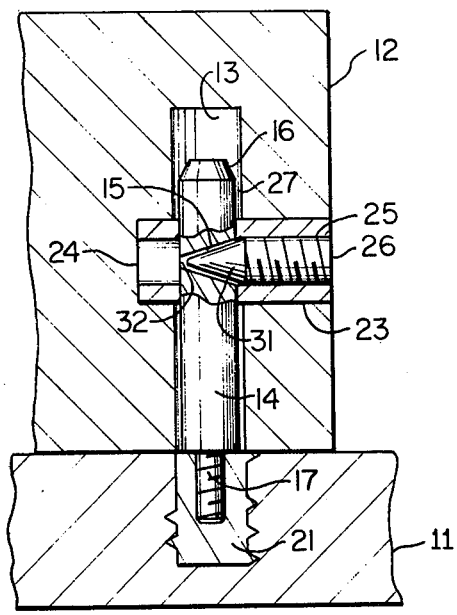
FIG. 3 is a sectional view through section 3—3 of FIG. 1 helpful in understanding how the invention secures the two members together.

Referring to FIG. 3, there is shown a view through section 3—3 of FIG. 1 except that set screw 26 is shown inside threaded opening 25 of set screw holder 24. As set screw 26 advances inward into conical opening 15, its conical point 31 engages the upper face surrounding conical opening 15 and urges fastening rod 14 upward to firmly engage members 11 and 13, the tip of conical point 31 typically residing in the small opening 32 when set screw 26 is screwed in all the way, thereby firmly fastening members 11 and 12 together and providing substantial surface contact between set screw 26 and the face surrounding conical opening 15 to distribute the load over a considerable area and provide adequate structural strength that keeps members 11 and 12 together without slipping. While set screw 26 is shown with a slot head, it may have a Phillips head or hexagonal socket for actuation by a Phillips head screwdriver or Allen wrench, respectively.

The set screw holder 24 performs a number of functions. It carries set screw 26 and allows the set screw to be screwed into conical opening 15. It coacts with fastening rod 14 to allow fastening rod 14 to move along its length while restricting movement perpendicular to its length, and fastening rod 32 prevents set screw holder 24 from rotating as set screw 26 rotates, the assembly of elements coacting to form a secure anchor that locks lower member 11 and upper member 12 together for as long as is desired without slipping while facilitating separation of these members should that be desired upon unscrewing set screw 26.

Figure 4:
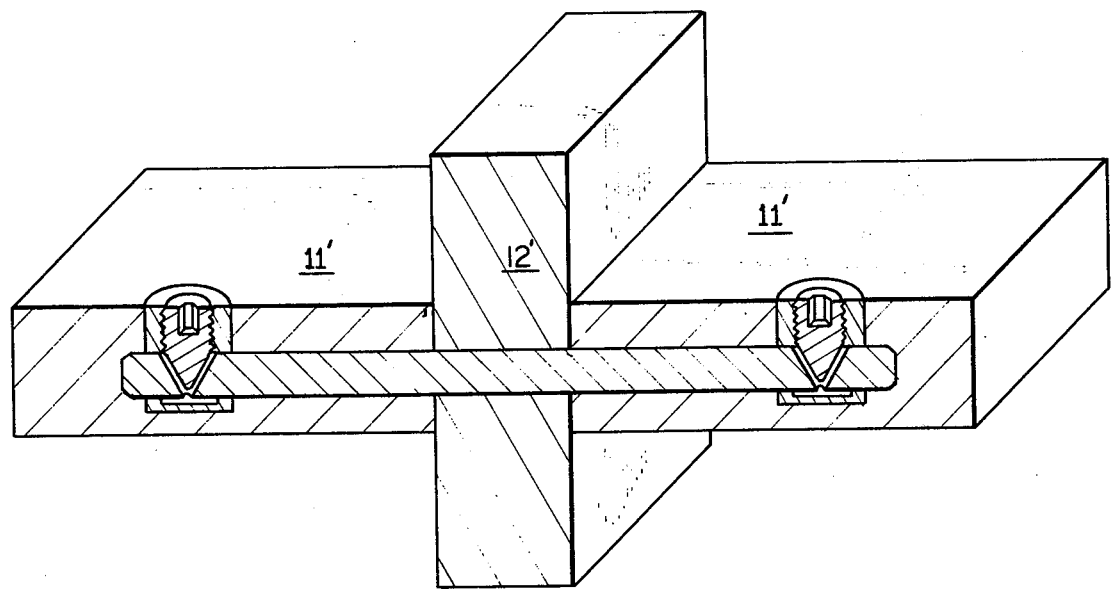
FIG. 4 is a perspective view partially in section of an embodiment of the invention using a fastening rod according to the invention at both ends.

Fastening rod 14 is shown as a straight rod. However, it may be bent, for example, when fastening two members together at an angle. Alternatively, fastening rod 14 may have conical openings near both ends and similar set screw assemblies, as shown in FIG. 4. Fastening rod 14 might be Y-shaped for securing a number of members together. It is also within the principles of the invention to screw the set screw directly into a member to be fastened.

It is evident that those skilled in the art may now make numerous other modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Fastening apparatus comprising, fastening rod means for fastening first and second members together formed with a conical opening near one end extending from at least one side of the fastening rod means to the center thereof and having connection means near another end thereof for connection to the second member, set screw means formed with a conical end for being seated inside the first member and screwed into said conical opening for engagement with the surface around said conical opening for urging said fastening rod means in a direction toward said one end for fastening the first and second members together, said conical opening extending across the center of said fastening rod means at least almost to the opposite side of said fastening rod means, and set screw holder means formed with an internally threaded opening for accommodating said set screw means and a fastening rod opening extending through said set screw holder means for allowing movement of said fastening rod means along the fastening rod means axis while restricting said movement of said fastening rod means orthogonal to the latter axis with said one end extending outside said set screw holder means for accommodating said fastening rod means and embracing said conical opening and the conical end of said set screw means.

2. Fastening apparatus in accordance with claim 1 and further comprising said first member formed with a first bore for accommodating said fastening rod means and a second bore generally perpendicular to and intersecting said first bore for accommodating said set screw means.

3. Fastening apparatus in accordance with claim 1 and further comprising said first member formed with a first bore for accommodating said fastening rod means and a second bore generally perpendicular to and intersecting said first bore for accommodating said set screw means.

4. Fastening apparatus in accordance with claim 1 wherein said one end is slotted along the direction coinciding with that of the axis of said conical opening.

5. Fastening apparatus in accordance with claim 1 wherein the other end of said fastening rod means is formed with a threaded stud for engagement with an internally threaded expandable insert and further comprising, said internally threaded expandable insert for engagement with the second member.

6. Fastening apparatus in accordance with claim 5 and further comprising, a second conical opening formed near said another end of said fastening rod means extending from at least one side of the fastening rod means to the center thereof, said connection means comprising second set screw means formed with a conical end for being seated inside the second member and screwed into said second conical opening for engagement with the surface around said second conical opening for urging said fastening rod means in a direction toward said another end for fastening the first and second members together.

7. Fastening apparatus in accordance with claim 6 and further comprising second set screw holder means formed with an internally threaded opening for accommodating said second set screw means and a fastening rod opening for accommodating said fastening rod means and embracing said second conical opening and the conical end of said second set screw means.

8. Fastening apparatus in accordance with claim 3 wherein said first and second bores are open only at one end.

* * * * *